(12) United States Patent
Bhowan et al.

(10) Patent No.: US 10,558,933 B2
(45) Date of Patent: Feb. 11, 2020

(54) MERGING FEATURE SUBSETS USING GRAPHICAL REPRESENTATION

(71) Applicant: INTERNATIONAL BUSINESS MACHINES CORPORATION, Armonk, NY (US)

(72) Inventors: Urvesh Bhowan, Bray (IE); Keith Cortis, Rabat (MT); Seamus R. McAteer, Navan (IE); Daniel J. McCloskey, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 15/085,038

(22) Filed: Mar. 30, 2016

(65) Prior Publication Data

US 2017/0286422 A1    Oct. 5, 2017

(51) Int. Cl.
*G06N 20/00* (2019.01)
*G06F 16/901* (2019.01)

(52) U.S. Cl.
CPC ......... *G06N 20/00* (2019.01); *G06F 16/9024* (2019.01)

(58) Field of Classification Search
CPC ......... G06F 17/30958; G06F 17/30651; G06F 16/9024; G06N 5/022; G06N 99/005; G06N 20/00
See application file for complete search history.

(56) References Cited

U.S. PATENT DOCUMENTS

| | | | | |
|---|---|---|---|---|
| 6,216,134 B1 * | 4/2001 | Heckerman | ........ | G06Q 30/0643 707/749 |
| 8,019,594 B2 | 9/2011 | Weng et al. | | |
| 8,126,825 B2 | 2/2012 | Guyon | | |
| 8,180,581 B2 * | 5/2012 | Ivosev | ................ | H01J 49/0036 250/339.07 |
| 8,266,078 B2 * | 9/2012 | Zou | ...................... | G06K 9/6253 706/12 |
| 8,312,049 B2 * | 11/2012 | Chayes | ................ | G06K 9/6224 707/793 |

(Continued)

FOREIGN PATENT DOCUMENTS

| | | |
|---|---|---|
| WO | 2006004797 A2 | 1/2006 |
| WO | 2014195782 A2 | 12/2014 |

OTHER PUBLICATIONS

IBM: List of IBM Patents or Patent Applications Treated as Related (Appendix P), May 26, 2016, pp. 1-2.

(Continued)

*Primary Examiner* — Miranda Le
(74) *Attorney, Agent, or Firm* — Erik K. Johnson (57) ABSTRACT

A system, method and computer program product provides improved performance in machine learning, decision making and similar processes. In one example method, a plurality of individual subsets of features of a dataset comprising multiple features are received. The subsets may be provided by applying one or more feature selection methods to the dataset. Each subset is represented as a graph based on a predefined graph template. The example method merges the graphs of the plurality of individual subsets by overlaying the graphs on each other to form a merged feature graph. The merged feature graph may be used for identifying a single subset of features for use in machine learning, decision making and similar processes.

6 Claims, 7 Drawing Sheets

(56) References Cited

U.S. PATENT DOCUMENTS

| | | | |
|---|---|---|---|
| 8,705,870 B2* | 4/2014 | Wang | G06F 17/30247 |
| | | | 382/173 |
| 9,092,989 B2 | 7/2015 | Agarwal et al. | |
| 9,690,871 B2* | 6/2017 | Hua | G06Q 30/0251 |
| 9,846,885 B1* | 12/2017 | Sarshar | G06Q 30/0201 |
| 2003/0074298 A1* | 4/2003 | Daum | G06Q 30/06 |
| | | | 705/37 |
| 2004/0111255 A1* | 6/2004 | Huerta | G06F 17/278 |
| | | | 704/10 |
| 2005/0131847 A1* | 6/2005 | Weston | G06K 9/623 |
| | | | 706/12 |
| 2007/0171716 A1* | 7/2007 | Wright | G06T 11/206 |
| | | | 365/185.12 |
| 2008/0086551 A1* | 4/2008 | Moy | G06Q 10/10 |
| | | | 709/223 |
| 2008/0172375 A1* | 7/2008 | Burges | G06F 17/30675 |
| 2008/0320014 A1 | 12/2008 | Chu et al. | |
| 2010/0082617 A1* | 4/2010 | Liu | G06F 17/30675 |
| | | | 707/729 |
| 2011/0106735 A1 | 5/2011 | Weston et al. | |
| 2011/0137919 A1* | 6/2011 | Ryu | G06F 16/9024 |
| | | | 707/748 |
| 2011/0184896 A1 | 7/2011 | Guyon | |
| 2011/0289025 A1* | 11/2011 | Yan | G06N 20/00 |
| | | | 706/12 |
| 2012/0166368 A1 | 6/2012 | Kim | |
| 2014/0344230 A1* | 11/2014 | Krause | G06F 17/30867 |
| | | | 707/693 |
| 2016/0219066 A1* | 7/2016 | Vasseur | H04L 63/1425 |
| 2017/0046735 A1* | 2/2017 | Koh | G06Q 30/0254 |
| 2018/0025303 A1* | 1/2018 | Janz | G06F 19/00 |
| | | | 705/2 |

OTHER PUBLICATIONS

Bhowan et al., Pending U.S. Appl. No. 15/164,909, filed May 26, 2016, titled "Merging Feature Subsets using Graphical Representation,", pp. 1-50.

Yang et al., "Feature Grouping and Selection Over an Undirected Graph", KDD '12, Aug. 12-16, 2012, pp. 1-9.

Kate et al., "Fast Feature Subset Selection Algorithm Based on Clustering for High Dimensional Data", International Journal of Engineering Research and General Science, vol. 2, Issue 6, Oct.-Nov., 2014, pp. 1-6.

Chaikla et al., "Genetic Algorithms in Feature Selection", Proceedings of the IEEE International Conference on Systems, Man and Cybernetics, vol. 5, 1999, pp. V-538-V-540.

Zhang et al., "A Graph-Based Approach to Feature Selection", GbRPR 2011, LNCS 6658, pp. 205-214.

Bhowan et al., "Genetic Programming for Feature Selection and Question-answer Ranking in IBM Watson", EuroGP 2015, LNCS 9025, pp. 153-166.

Revathi et al., "Survey: Effective Feature Subset Selection Methods and Algorithms for High Dimensional Data", International Journal of Advanced Research in Computer Engineering & Technology (IJARCET) vol. 2, Issue 12, Dec. 2013, pp. 3184-3190.

* cited by examiner

| KEY | |
|---|---|
| Edge | Subset Derivation |
| ——————— | Feature Subset A |
| - - - - - - - - - | Feature Subset B |
| — · — · — · — | Feature Subsets A & B |

MERGING FEATURE SUBSETS USING GRAPHICAL REPRESENTATION

BACKGROUND

The present invention relates generally to the field of machine learning, and more particularly to, systems and methods for improving the performance of systems and applications implementing machine learning.

Machine learning may be used in a variety of systems and applications for performing automated and semi-automated tasks such as problem solving, decision making and prediction. In the field of image processing, machine learning systems may be used for object or image recognition, for example, in applications such as face-recognition, handwritten digit recognition, and obstacle recognition in self-navigating vehicles. In the medical field, machine learning may be used for applications such as medical diagnostics or bioinformatics. In industrial fields, machine learning may be used for applications such as fault detection in networks and industrial systems.

Machine learning requires the development of a model using training data relating to a number of features or variables. Once a satisfactory model is developed, the model can be applied to real world data to provide an outcome for the relevant task. In most applications, large quantities of high quality training data are needed for good system performance, typically relating to large numbers of features.

As the number of features used in the model and training data increases, various problems arise. This is known as "the curse of dimensionality". In particular, the higher the data dimensionality (i.e., the higher the number of features) the worse the performance degradation and the less predictable the behavior on real unseen data. In addition, as data dimensionality increases, the execution/training times increase together with the computational resources required by the system. Moreover, the higher the data dimensionality, the greater the lack of knowledge by administrators of the system about the most useful features/components in the system, and the greater the effects of feature inter-dependence in the system.

SUMMARY

Embodiments of the present invention disclose a method, computer program product, and system for According to an aspect of the present disclosure, a computer-implemented method is provided. The method receives a plurality of individual subsets of features of a dataset of features, each subset represented as a graph based on a predefined template. The method merges the plurality of graphs by combining elements of the graphs to form a merged feature graph for use in identifying a single subset of features therefrom.

The merged feature graph provided in accordance with the present disclosure may be used to determine a single subset of features that is more optimized, (i.e., more useful or relevant) than a subset of features identified by existing techniques, and so can be used to develop a better model for improved performance.

In example implementations of the method, the predefined graph template comprises nodes that represent features in the subset, and edges between pairs of nodes. Each edge of the graph represents a relationship, which may be any type of connection or inter-dependency, between the feature pair represented by the two nodes that are connected by the edge. In example implementations, each of the edges has an edge weight (or strength value).

In example implementations, the method creates a graph for each received feature subset based on the predefined template by mapping the features of the subset to nodes and connecting pairs of features of the subset by an edge. In some example implementations, the method determines an edge weight for each edge in the graph.

By including edges in the predefined graph template in example implementations of the present disclosure, relationships between features in the subset, and thus the connection or inter-dependence between the features, can be taken into account in identifying the single subset of features. Such relationships or inter-dependence may be significant for models in some applications. For example, the effect or usefulness of one feature on a machine learning model may be dependent upon the presence of one or more other features. This relationship or inter-dependency between the features is sometimes called "feature epistasis". Although analogous, feature epistasis is not limited to applications in the field of genetics, in which the concept of epistasis (i.e., gene inter-dependence) was originally conceived. Thus, the edges in the graphs created from the received feature subsets represent a measure of feature epistasis such as a high level knowledge of how features in the subset relate to each other. In this way, the relationships between features in the received feature subsets may be considered and taken into account in the selection of a single best-performing feature subset for a particular model, leading to a model with improved performance, e.g., in terms of accuracy, evaluation speed etc.

In example implementations, the method merges the graphs by combining overlapping nodes from different graphs into a merged node, wherein the overlapping nodes from different graphs represent the same feature in the dataset. In example implementations, the method merges the graphs by combining overlapping edges from different graphs into a merged edge, wherein the overlapping edges from different graphs extend between a pair of nodes representing the same pair of features in the dataset.

In example implementations, the method combines the edge weights of overlapping edges from different graphs (i.e., edges that are shared by two or more of the graphs) to form a merged edge weight for each edge in the merged feature graph. For example, the merged edge weight of an edge may be combined by simple addition of the edge weights of the edges from each of the graphs.

In example implementations, the method uses the merged feature graph to identify the single subset of features. For example, the single subset of features may be selected based on one or more of: all of the features represented by nodes in the merged feature graph; a threshold number of the most relevant features represented by nodes in the merged feature graph; all features represented by nodes in the merged feature graph meeting a threshold relevance value; all features of feature pairs represented by edges in the merged feature graph meeting a threshold merged edge weight, and features represented by nodes or connected by edges in the merged feature graph meeting any other suitable threshold.

In example implementations, the method provides a visualized representation of the merged feature graph, to enable user selection of the single subset of features. The visualization may be presented to the user on any suitable user interface, for example it may be shown on a display screen or printed by a printer.

In example implementations, the method generates the plurality of individual subsets of features of the dataset using one or more feature selection methods. For example, the method may generate the plurality of feature subsets using multiple different selection methods that may implement different selection algorithms.

The use of different selection methods to provide the plurality of individual feature subsets benefits from the diversity and strengths of the different methods so as to include all potentially useful or relevant features when generating the merged feature graph. This ensures, in accordance with preferred embodiments, that relevant features are not excluded.

According to another aspect of the present disclosure, a system is provided. The system comprises a processor. The processor is configured to receive a plurality of individual subsets of features of a dataset comprising multiple features, each subset represented as a graph. The processor is configured to merge the plurality of graphs by combining elements of the graphs to form a merged feature graph for use in identifying a single subset of features therefrom. In example implementations, the processor may be further configured to perform steps of the methods disclosed herein.

According to another aspect of the present disclosure, a computer program product is provided. The computer program product comprises a computer readable storage medium having program instructions embodied therewith. The program instructions are executable by a processor to cause the processor to receive a plurality of individual subsets of features of a dataset comprising multiple features, each subset represented as a graph. The program instructions are further executable by a processor to cause the processor to merge the plurality of graphs by combining elements of the graphs to form a merged feature graph for use in identifying a single subset of features therefrom. In example implementations, the program instructions may be further executable by a processor to cause the processor to perform steps of the methods disclosed herein.

According to yet another aspect of the present disclosure, a computer-implemented method is provided. The method receives a plurality of individual subsets of features of a dataset of features. For each received subset of features, the method creates a graphical representation of the feature subset based on a predefined template. The predefined template includes a feature element for representing a feature of the subset and a feature relationship element for representing a relationship between a pair of features of the subset. The method uses the graphical representation of each feature subset to provide a visualized representation of the plurality of feature subsets to a user for use in identifying a single subset of features.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Existing approaches to the problems of high data dimensionality seek to find a subset of the most relevant or useful features, and to use only the subset of features to develop or refine the model. For example, United States Patent Application Publication US2011/184896 A1 to Guyon proposes feature selection by visualization of subsets of features from a plurality of features of a dataset. One or more classifiers are trained using each subset of features and the success rate of the classifiers in accurately classifying the dataset is calculated. The success rate is converted into a ranking that is represented as a visually distinguishable characteristic. One or more tree structures may be displayed with a node representing each feature, and the visually distinguishable characteristic is used to indicate the scores for each subset of features. This approach requires the performance or success rate of each subset of features to be evaluated on the dataset, which is time consuming and requires considerable processing resources. Furthermore, this approach builds non-overlapping feature paths in the constructed tree in order to find minimal paths, which is limiting since it is unable to consider and account for inter-dependencies of features. The nature and significance of the inter-dependence of a feature with other features is discussed further below.

U.S. Pat. No. 8,019,594 B1 to Weng et al proposes progressive feature selection. Features are selected in multiple rounds, whereby the feature selection process is repeated on successively smaller numbers of feature sets until a single final set of features is selected. This approach involves feature reduction, whereby features are excluded from consideration. This can be detrimental to the final subset selection, since relevant and useful features may be excluded from consideration. In addition, the approach is time consuming and requires considerable processing resources.

Accordingly, existing techniques for reducing data dimensionality by feature selection may be inaccurate, by failing to select all of the most relevant or useful features. This may lead to inaccurate models, and, in consequence, poor performance of systems and applications that apply the model to real world data, in practice. In addition, existing techniques may require significant computing resources and/or take significant time to complete in order to develop an accurate model. Finally, existing techniques are limited in that they consider individual features when selecting the feature subsets and are unable to accumulate knowledge about inter-dependencies between features.

In the development of a model for machine learning or another model-based tool, it is desirable to identify a subset of the most relevant or useful features of a dataset for use in training the model. In this way, the data used to train the learning machine relates only to the subset of features of the dataset so that the training time and processing resources required is within practical limits. Nevertheless, existing techniques remain unduly time consuming and resource intensive, and a balance has to be struck between the model development time and resources versus the performance of the final model when applied in practice. Since the model development time and available resources is finite, the performance of the final model is generally sacrificed to some degree. In consequence, technical applications, such as image or object recognition in image processing or fault detection in industrial systems, may be sub-optimal and/or inaccurate in real world applications.

In preferred embodiments of the present invention, a system may identify a single subset of features, or a "super-set" of features, of the most relevant or useful features of a dataset for training a model. As described in more detail below, the disclosed technique for identifying the super-set of features has significant advantages over existing techniques, leading to more optimized and/or accurate outcomes when developing and applying the model to real world applications.

Figure 1:
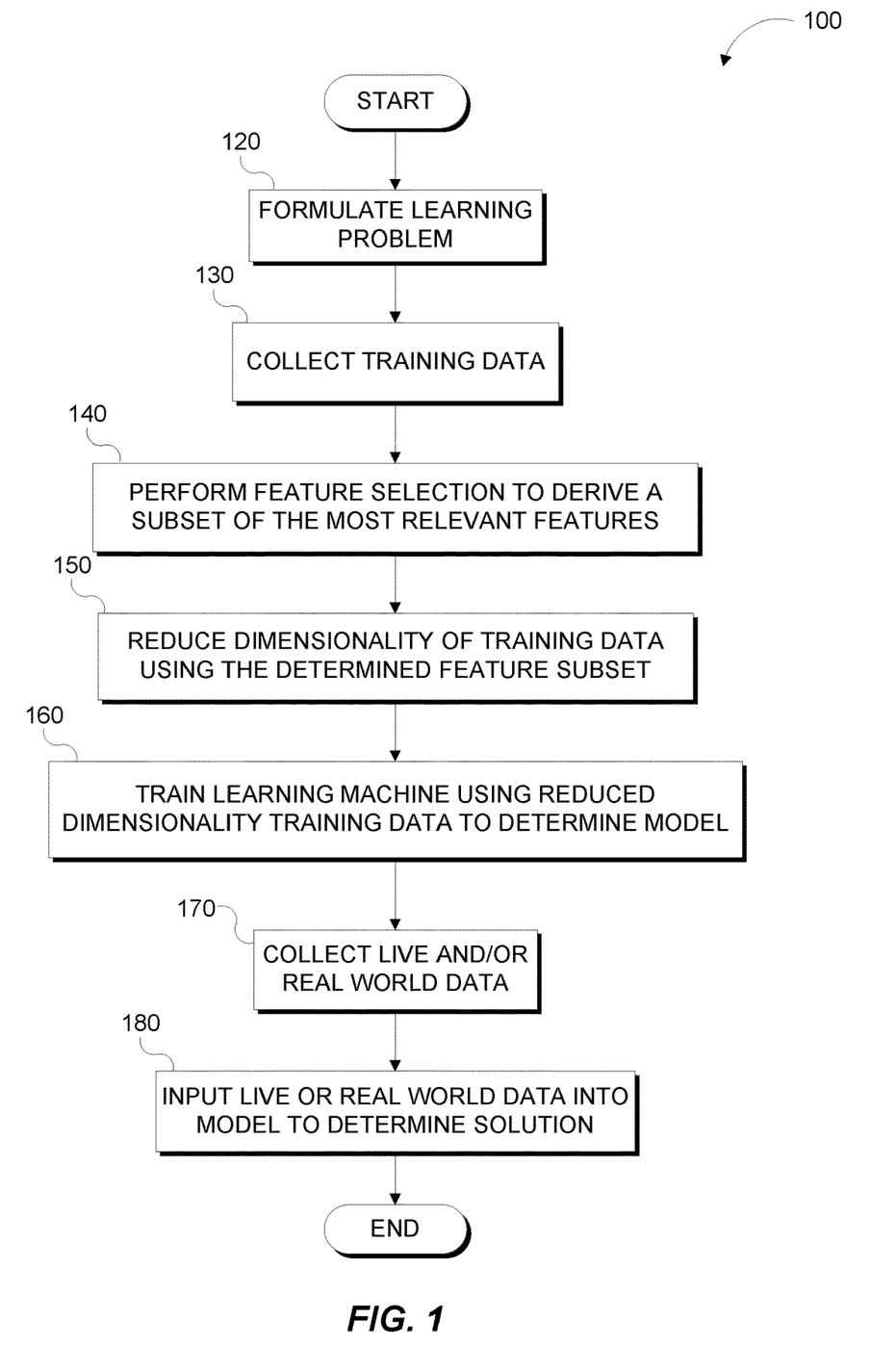
FIG. 1 is a flowchart depicting operational steps for developing a model for machine learning, in accordance with an embodiment of the present invention.

The present invention will now be described in detail with reference to the Figures. FIG. 1 is a flowchart depicting operational steps for developing a model for machine learning, in accordance with an embodiment of the present invention. The method 100 illustrates the development of a model for machine learning, machine learning problem, or application using training data. The final model may be used, in turn, to derive solutions when applied to live and/or real world data.

In step 120, a learning problem is formulated and training data is collected or received, in step 130. The training data received in step 130 includes features or variables, as described above. The generation of a learning problem and the receipt of training data are conventional tasks in the field of machine learning and can be performed using any suitable technique.

In step 140, received features are analyzed in order to select a subset of features that are most relevant. The selection is further described in reference to FIGS. 2-5. In step 150, the determined subset of features reduce the dimensionality of the training data. The resulting training data includes only data related to the subset of features. Reducing the dimensionality of the training data is a conventional task in the field of machine learning and can be performed using any suitable technique.

In step 160, the learning machine is trained, using the learning problem and the reduced dimensionality training data, as seen in step 150, to determine a final model for the machine learning problem or application. Such training of a learning machine is a conventional task in the field of machine learning and can be performed using any suitable technique. The training may involve testing and optimizing the model, again using any suitable technique.

In various embodiments, the machine learning ends at step 160. In additional embodiments, practical or real world data may be implemented. The method 100 may collect live and/or real world data at step 170, and input the collected live and/or real world data into the model to determine a solution at step 180. Thus, in implementation examples that involve optional steps 170 and 180, the method 100 ends after step 180.

Those skilled in the art will appreciate that the steps of the flowchart of FIG. 1 can be carried out in any suitable order. For example, steps 140 to 160 may be performed after development of an initial model or after the use of an existing model with real world data, in order to refine or further develop the model for improved performance.

Figure 2:
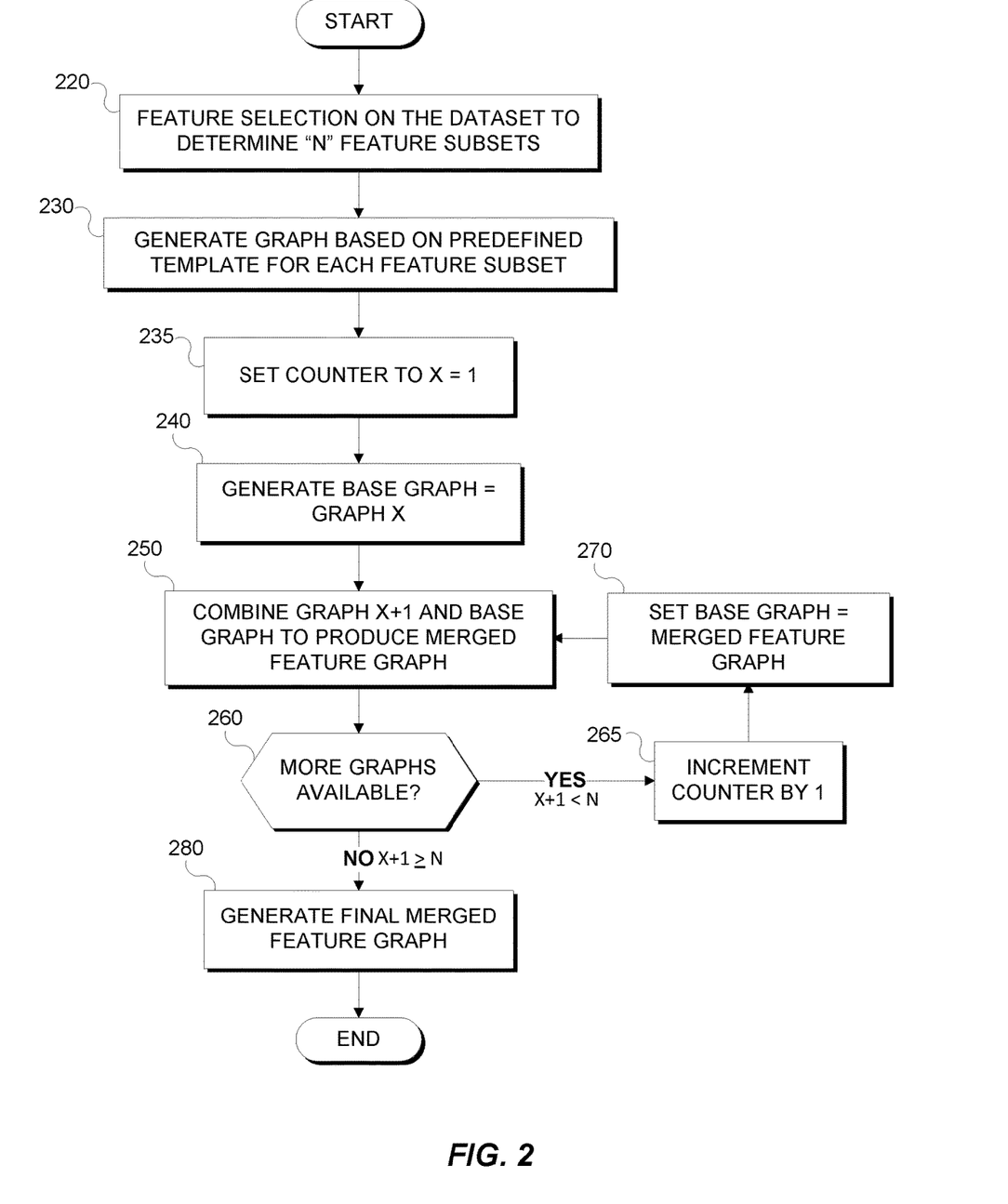
FIG. 2 is a flowchart depicting operational steps for selecting a subset of features of a dataset, according to an embodiment of the present invention.

In reference to FIG. 2, FIG. 2 is a flowchart depicting operational steps for selecting a subset of features of a dataset, according to an embodiment of the present invention. In step 220, features are selected from the received dataset and a plurality of "N" feature subsets are determined. In various embodiments, N may be an integer greater than 1. N is selected according to the requirements of the particular application, for example, an integer between 50 and 500 or more. As the skilled person will appreciate, the number N should be as large as possible but is limited, in practice, by the processing time and resources available. The feature selection in step 220 may use any suitable technique including known feature selection algorithms.

In various embodiments, multiple feature selection techniques are used in step 220 to derive the N feature subsets. The use of multiple feature selection techniques advantageously exploits the strengths of such techniques whilst obviating any weaknesses that may arise. For example, one feature selection technique may use feature reduction so as to exclude a relevant feature from all of its resulting feature subsets. By using another feature selection technique, the excluded relevant feature may be identified and included in its feature subsets, and therefore within the N feature subsets. Thus, the use of multiple feature selection techniques ensures diversity within the N feature subsets.

In step 230, graphs are generated for each of the N feature subsets. As discussed further below, data for individual feature subsets determined using different feature selection methods may take different forms. Accordingly, it is desirable to generate a graph for each feature subset in accordance with a predefined template so that the graphs have the same format. In various embodiments, the graph may be a simple undirected graph. The skilled person will appreciate from the present disclosure that the predefined graph template may take other forms, including other types of graph or diagram. Further details of example implementations of suitable graphs, and how they may be created, are provided below with reference to FIGS. 3, 4A, 4B & 5.

At step 235 a counter X is set to X=1. Step 240 a graph is generated for subset X of the N individual feature subsets, and sets it as the current base graph. Step 250 selects the graph for subset X+1 and overlays it over the current base graph, or otherwise combines the elements of the selected graph with the current base graph, combining into, or generating a merged feature graph, as discussed in further detail below with reference to FIGS. 3, 4A, 4B & 5.

Additional graphs are available, in determination step 260 "YES" branch, if the Nth feature subsets that has not yet been selected. As illustrated in FIG. 2, this may be done by determining whether X+1 is less than N. If step 260 determines that X+1 is less that N, then there are additional graphs for selection, and the method proceeds to step 265. If step 260 determines that X+1 is greater than or equal to N, then there are no additional graphs for selection and the method proceeds to step 280.

In step 265, the counter is increased where X incrementally increases by 1, and, in step 270, the base graph is replaced with the previous merged feature graph generated in step 250. An updated merged graph is generated from the new base graph and the next incremental feature graph, for example subset X+1. In various embodiments, the loop through steps 250, 260, 265 and 270 may continue until all N graphs of the N feature subsets have been included in the merged feature graph and there are no additional graphs for selection (Decision step 260 "NO" branch).

In step 280, the current merged feature graph is generated as the final merged feature graph and the process ends. The merged feature graph may be generated without evaluating or testing the individual subsets of features, which may reduce the processing time and resources required for feature selection. In addition, the merged feature graph may include accumulated information not only about the occurrence of features in subsets derived using the same or different feature selection methods but also about the occurrence of relationships between features, such as inter-dependencies and/or interactions of features (i.e., feature epistasis). The merged feature graph also allows multi-dimensional feature relationships and/or interactions to be identified and considered such as second, third and fourth order relationships between features in subsets. The merged feature graph can be readily visualized and understood by a user, who can derive additional knowledge about the features and their relationships through viewing and traversing nodes, representing features thereof and the edges, representing their inter-relationships.

The skilled person will appreciate that the principles of the method of the flowchart of FIG. 2 can be implemented using alternative techniques, for example, without the use of a counter. Concurrent merging of multiple graphs may also be possible. For example, groups of graphs of feature subsets, derived using different feature selection techniques, may be processed and merged in parallel, and the merged feature graphs for the different groups may be merged in a final merging step. In various embodiments, steps 220 and 230 may be omitted if the method receives graphs representing the individual feature subsets based on a predefined graph template.

Figure 3:
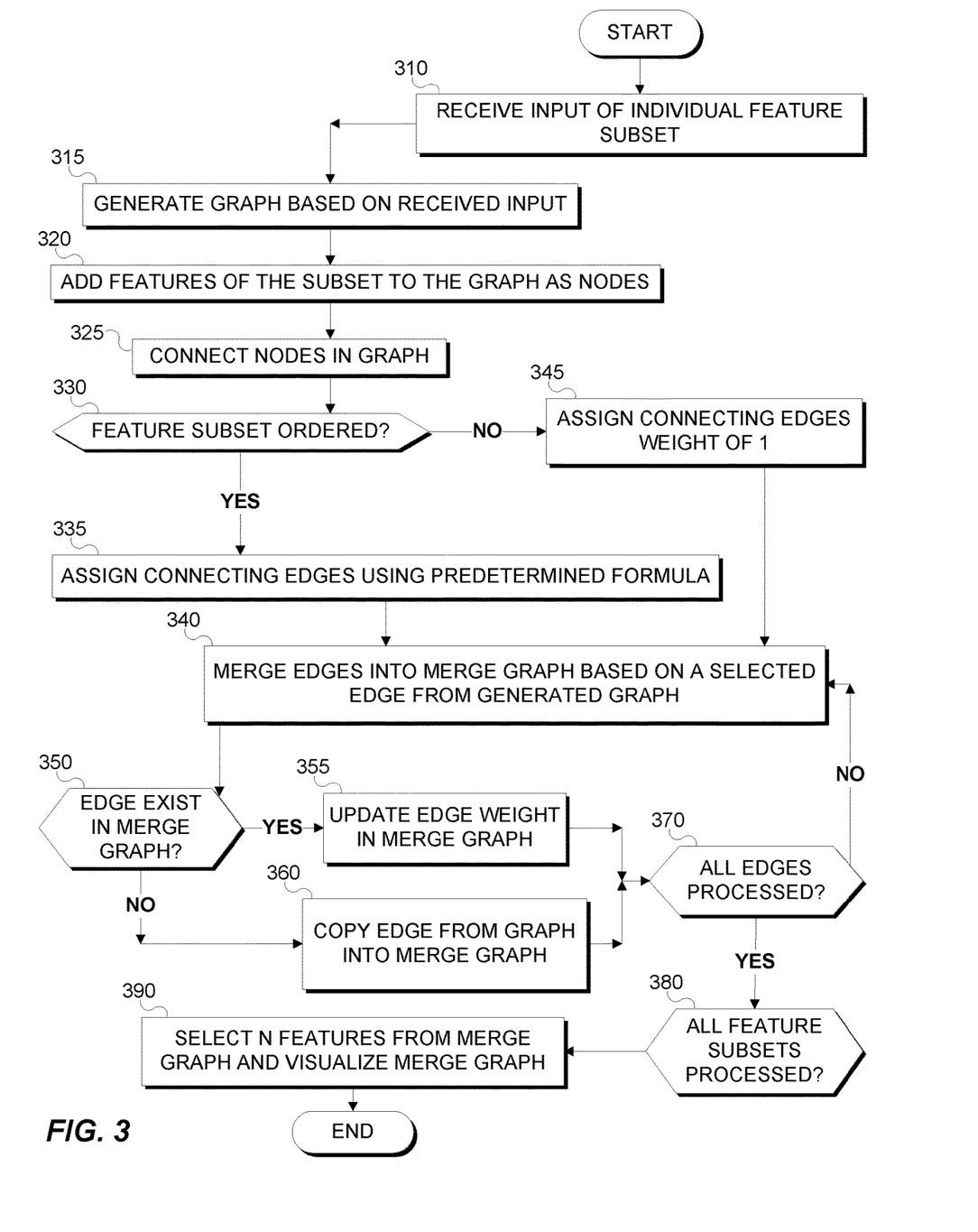
FIG. 3 is a flowchart depicting operational steps for generating a merged feature graph, using a plurality of individual subsets of features of a dataset, according to an embodiment of the present invention.

FIG. 3 is a flowchart depicting operational steps for generating a merged feature graph, using a plurality of individual subsets of features of a dataset, according to an embodiment of the present invention.

Those skilled in the art will appreciate that the plurality of individual subsets of features of a dataset may be provided by applying any suitable feature selection technique to the dataset. Dependent upon the type of feature selection method used, one or more of the plurality of subsets may comprise a ranked list of the features of the subset. The ranked list of features of the subset may be ordered or ranked according to accuracy, relevance or the like, as determined by the corresponding feature selection.

In step 310, an input is received, the input being an individual subset of features from the plurality of subsets. In step 315, a new graph is generated to represent the subset of features, based on a predefined graph template. In step 320, additional features of the subset are added to the graph as nodes of the graph and the nodes are connected in pairs with each other as edges, in step 325, based on the graphical template, in accordance with an embodiment of the present invention.

Figure 4A:
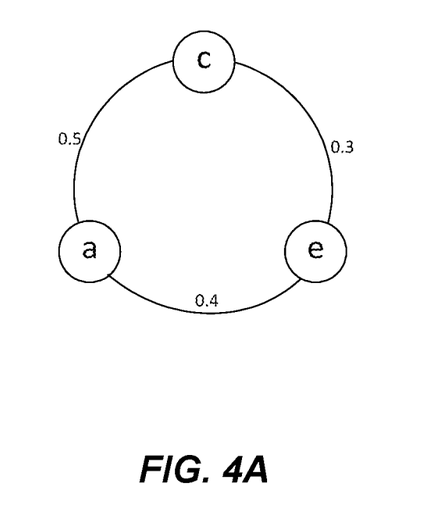
FIG. 4A and FIG. 4B illustrate a graph representing a ranked list of a received subset of features of a dataset that may be used or created, according to an embodiment of the present invention.
Figure 4B:
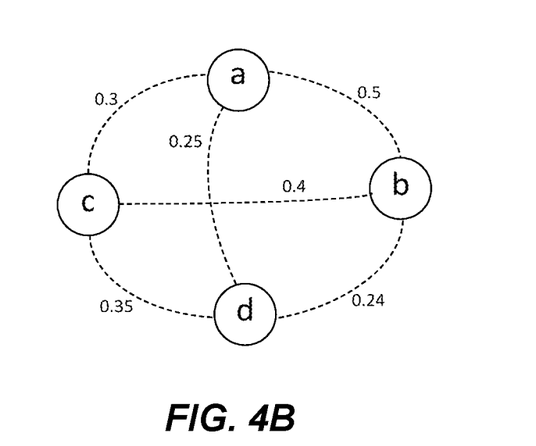

Referring to FIGS. 3, 4A, and 4B, FIGS. 4A and 4B illustrate exemplary ranked lists and generated graphs on an exemplary graph template created using two individual subsets of features called "Feature Subset A" and "Feature Subset B", received as inputs at step 310 of FIG. 3. Feature Subset A comprises three features, a, c and e, and Feature Subset B comprises four features, a, b, c and d. In the exemplary embodiment illustrated in FIGS. 4A and 4B, the graph template is a simple undirected graph comprising nodes to represent features and edges between pairs of nodes in the graph. The edges represent one or more relationships between feature pairs represented by the node pairs, as discussed in further detail below. In the predefined graph template, every node within the feature subset is connected by an edge to every other node. In addition, in accordance with the graph template, an edge weight, or "strength value" is assigned to each edge in the graph using a predefined method.

In reference to FIGS. 3 and 4A, FIG. 4A illustrates a graph representing a ranked list of a received subset of features of a dataset that may be used or created, according to an embodiment of the present invention. It should be appreciated that the graph in 4A is an exemplary embodiment of the graph generated in steps 315, 320, and 325, of FIG. 3. For example, a subset of features a, c, and e were received and each received feature is mapped as a corresponding node, each node connected to all other nodes by edges.

The graph of FIG. 4A depicts three nodes a, c and e and three edges c-a, c-e and a-e. Similarly, FIG. 4B illustrates a graph created by steps 315, 320 and 325 of FIG. 3 from a received subset of features a, b, c and d, by mapping each feature to a node in the graph and connecting each node to all other nodes by edges. Thus, the graph of FIG. 4B depicts four nodes a, b, c and d and six edges a-b, a-c, a-d, b-c, b-d and c-d. The graphs shown in FIGS. 4A and 4B also show an edge weight value assigned to each edge of the graph.

Returning to FIG. 3, it is determined in step 330 whether the individual subset of features has been received with an ordering or ranking of the features, such as in a ranked list. As shown in FIGS. 4A and 4B, for example, Feature Subset A, comprising features a, c, and e, and Feature Subset B, comprising features a, b, c, and d are received in a ranked list. Such ordering of the features may be determined, and a corresponding ranked list provided, by feature selection algorithms, for example, as part of relevance data that indicates the relevance or relative relevance of the features in the individual subset or by pre-processing data received from feature selection algorithms having relevance data from which a ranking can be derived.

In step 330 "NO" branch, it is determined that the subset does not have an ordering of the features, and all edges are assigned an edge weight of a predetermined value, for example, an edge weight value of 1, in step 345. In step 330 "YES" branch it is determined that the subset has an ordering of the features, and an edge weight is assigned to each of the edges, in step 335, where each edge weight is calculated based on the ordering of the pair of features connected by the corresponding edge. In particular, the edge weight represents a relationship between the pair of features mapped to the two nodes connected by the edge. In example implementations, the edge weight represents a normalized distance between the nodes, which represents a measure of a relationship between the feature pair such as the inter-dependence of the feature pair. In example implementations, the edge weight for each edge may be calculated using a predetermined formula. The predetermined formula may be based on an inverse of the ranking position difference between the feature pair. Examples of a suitable predetermined formula are discussed in more detail below.

The following Tables 1A and 1B illustrate how the edge weights for the graphs shown in FIGS. 4A and 4B, respectively, may be calculated in an example implementation of the present invention. The rows in the tables correspond to individual edges between node pairs (corresponding to feature pairs). For example, Table 1A has three rows representing the three edges of the graph of FIG. 4A: c-a, c-e and a-e.

TABLE 1A

| Edge | Pos. Diff. | Decay | Edge Weight |
|---|---|---|---|
| c-a | 1 | 0 | 0.5 * 1 = 0.5 |
| c-e | 2 | 0 | 0.3 * 1 = 0.3 |
| a-e | 1 | 1 | 0.5 * 0.8 = 0.4 |

TABLE 1B

| Edge | Pos. Diff. | Decay | Edge Weight |
|---|---|---|---|
| a-b | 1 | 0 | 0.5 * 1 = 0.5 |
| a-c | 2 | 0 | 0.3 * 1 = 0.3 |
| a-d | 3 | 0 | 0.25 * 1 = 0.25 |
| b-c | 1 | 1 | 0.5 * 0.8 = 0.4 |
| b-d | 2 | 1 | 0.3 * 0.8 = 0.24 |
| c-d | 1 | 2 | 0.5 * 0.7 = 0.35 |

For each edge, the last column in Tables 1A and 1B shows the edge weight or strength value calculated using the following formula:

$$\text{Edge Weight} = [1/(1+\text{Pos. Diff})] * [W * e^{(-\text{Decay}/5)}] \quad \text{(equation 1)}$$

In equation 1 above Pos. Diff is the difference in position between two features in the ranked list; W is weight for decay (the Tables use W=1 as an example), and Decay is top position of any two connected features in the ranked list, starting from 0 (i.e., 0 is top-ranked position, 1 is second-ranked position, etc.

Those skilled in the art will appreciate that other methods for determining the edge weights or strength values are possible and contemplated within the present disclosure and the above is merely an exemplary implementation of the present invention. As mentioned above, the edge weight of an edge represents a normalized distance between the nodes and a normalized value of a relationship, such as inter-dependence, between the feature pair connected by the edge.

Determining the edge weights of edges for the graph, as described above, may be based on a feature subset type, the feature subset type, for example, may depend upon the feature selection method used to produce the feature subset from the dataset. Below are some examples of the different types of feature subsets and suitable methods for determining edge weights.

Some example subsets of features may comprise a ranked list of features or value, (e.g., relevance value) for each of the features that enable the features to be ordered in a ranked list. The exemplary graphs shown in FIGS. 4A and 4B may each relate to such a subset comprising a ranked list of features based on relevance or accuracy. For this feature subset type, the edge weight for an edge between nodes representing features that are q positions apart, or q positions away from a predefined position, may be inversely proportional to q. For example, edge weight may equal 1/q, then the edge weight of edges between a feature at position p and features at positions p±1 is 1, the edge weight of edges between the feature at position p and features at positions p±2 is ½ and so on. Those skilled in the art will appreciate, in the edge weight formula of equation 1 above, that the edge weight is calculated based on 1/(1+q) rather than 1/q. Other variations are possible and contemplated within the scope of the present invention.

In various embodiments, subsets of feature may each comprise a group of features having explicit information about links (i.e., relationships such as inter-dependence) between features derived from the feature selection method and/or model representation. Such feature subsets may be produced by methods disclosed in, for example, Lecture Notes in Computer Science, Volume 9025, Springer. 2015 entitled "Genetic Programming for Feature Selection and Question-Answer Ranking in IBM Watson" by Urvesh Bhowan and D. J. McCloskey, where the model is an expression tree and features in the selected subsets are leaf nodes in the learned tree. In additional embodiments, the edge weight for edges between features of the subset represented by nodes that are connected by r non-leaf nodes may be inversely proportional to r. For example, if the edge weight=1/r, where r is the number of non-leaf nodes in the model tree connecting the feature pair that the edge connects, then edges between features having the same parent node in the tree may be assigned a value of 1, edges between features that have the same grandparent node in the tree may be assigned a value of ½, and so on. Other variations are possible and contemplated within the scope of the present disclosure. IBM Watson is a trademark of International Business Machines Corporation in the United States and/or other countries.

Other feature subsets may each comprise a group of features without any information about the links (i.e., relationships such as inter-dependence) between features within the feature subset. Such feature subsets may be produced by methods disclosed in, for example, IEEE International Conference on Systems, Man, and Cybernetic, Volume 538-340, 1999, entitled "Genetic Algorithms in Feature Selection" by N Chaikla et al. In particular, the feature selection methods produce a simple bit string indicating whether or not a feature is selected to be included in the subset. In this case, all edges are assigned a predefined edge weight, for example edge weight value=1, as in step 345 of FIG. 3. Other variations are possible and contemplated within the scope of the present invention.

Returning to FIG. 3, after assigning all edges of the graph with edge weights or strength values as described in steps 335 or 345 of FIG. 3, a merged feature graph (abbreviated herein to "merge graph") is generated in step 340. The merge graph combines the elements of multiple feature graphs, specifically the nodes representing features, and edges between features, of multiple subsets received at step 310. The merge graph combines the edge weights of edges between nodes representing feature pairs, in order to accumulate a measure of the frequency of occurrence, and thus importance of, relationships (e.g., connections or inter-dependencies) between feature pairs in the subsets. By considering relationships between features, as well as the individual features, in a plurality of subsets to determine a single subset for a model, the model can be optimized leading to improved performance. Those skilled in the art will appreciate, where the graph generated by steps 315, 320, 325, and 335 or 345 is the first feature subset to be processed, the generated merge graph corresponds to the graph for the first feature subset.

The merge graph is generated and an edge from the generated merge graph is selected in step 340. In step 350 it is determined whether the selected edge already exists in the merge graph. If step 350 determines that the selected edge already exists in the merge graph (decision step 350 "YES" branch), the edge weight of the selected edge in the merge graph using is updated, in step 355, for the edge weight for the selected edge in the graph. For example, the edge weight for the edge from the generated merge graph may be added to an existing edge weight of the selected edge in the merge graph. Other methods for combining or merging edge weights are possible and contemplated within the scope of the present invention. If it is determined that the selected edge does not exist in the merge graph (decision step 350 "NO" branch), the selected edge from the graph is copied into the merge graph together with the corresponding edge weight, in step 360.

If it is determined that all edges of the graph have not been processed (decision step 370 "NO" branch), another edge from the graph is selected in step 340. If it is determined that all edges of the graph have been processed and combined into the merge graph (decision step 370 "YES" branch) it is determined whether all feature subsets have been processed (decision step 380). If it is determined that further subsets from the plurality of subsets need to be processed (decision step 380 "NO" branch), the method returns to step 310 by receiving, as an input, another individual subset of features from the plurality of subsets, which is then processed to generate a graph, which is incorporated into the merge graph as described above. However, if it is determined that all subsets of the plurality of subsets have been processed (decision step 380 "YES" branch), N features are selected from the generated merge graph for visualization, in step 390.

Figure 5:
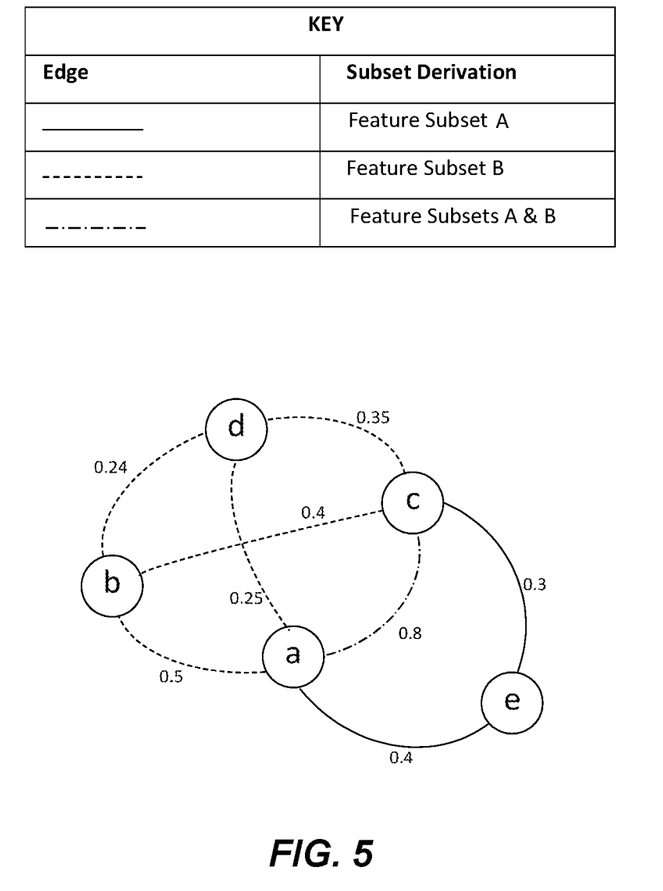
FIG. 5 illustrates a feature graph derived from merging the graphs of FIG. 4A and FIG. 4B, according to an embodiment of the present invention.

In various embodiments, step 390 may display a visualized representation of the merge graph, as shown in FIG. 5, further discussed below, as an output from step 380 to a user, to enable selection of a most relevant single subset of features therefrom by a user or otherwise. The graph may be presented to enable the user to readily perform selection based on the features and edge weights. For example, as described above, the edges in the merge graph may be color coded to denote the derivation from a particular feature subset graph or a combination of two or more feature subset graphs as in the key associated with FIG. 5, as described below. Those skilled in the art will appreciate, the determination of a single subset of features need not be limited by predetermined parameters such as subset size, and so is highly flexible for use with different applications.

Referring to FIG. 5, FIG. 5 illustrates a generated merge feature graph generated in step 370 of FIG. 3 by generating and merging the graphs of the two feature subsets, for example, Feature Subsets A & B, shown in FIGS. 4A and 4B. As illustrated in FIG. 5, the edge a-c exists in both of the graphs of FIGS. 4A and 4B. Specifically, in FIG. 4A, edge c-a has an edge weight of 0.5 and in FIG. 4B, edge a-c has an edge weight of 0.3. Accordingly, as illustrated in the merge graph of FIG. 5, the edge weight for edge a-c is the sum of the edge weights from the subset graphs, i.e., 0.5+0.3=0.8. The edges in the merge graph may be represented in different forms, for example by color coding, to denote the derivation from a particular subset graph or a combination of two or more subset graphs. For example, as shown in the key associated with FIG. 5, edges derived from the graph of FIG. 4A are represented by a solid line, edges derived from the graph of FIG. 4B are represented by a dashed line, and edges in the merge graph derived from both of the graphs of FIGS. 4A and 4B are represented by a dot-dashed line. Such indication of the derivation of edges in the merge graph provides additional transparency to, and ease of use of, the data, for the subsequent process of selecting a single subset of features as described below. Those skilled in the art will appreciate that the merge graph shown in FIG. 5 effectively corresponds to the two subset graphs of FIGS. 4A and 4B overlaid on each other with the edge weights combined for edges that are shared by the two graphs for Feature Subsets A & B. In various embodiments, the merge graph may include a node weight for each node, the node weight corresponding to the number of occurrences of the feature represented by the node in the plurality of feature subsets from which the merge graph is derived. The node weight may be depicted as a number or represented by the size or other form of the node.

Data may be received from a user representing the final merged feature graph and associated data into a graph analysis application such as IBM® Galaxy or GraphVIZ to provide an improved visualized representation of the merged feature graph, for example permitting the user to traverse the nodes and edges of the graph and view the associated edge weights, and to allow manipulation and statistical processing in order to determine a single subset of features. IBM is a registered trademark of International Business Machines Corporation in the United States and other countries.

A single subset of features may be determined, in an exemplary embodiment of the present invention, using the generated merged feature graph as described above in reference to FIG. 3. The features of the merged feature graph may be sorted, e.g., into a ranked list, according to a relevance score value. In various embodiments, the relevance score may be based on the edge weights of the edges connecting pairs of nodes, for example the sum of the edge weights of the edges connected to the respective nodes. In this way, the relevance of features and their inter-dependence is taken into account. Table 2 below shows a ranked list of the nodes (features) of the merged feature graph of FIG. 5.

TABLE 2

| Ranking Position | Node (Feature) | Sum of Edge Weights of Edges Connected to Node (Relevance Score) |
| --- | --- | --- |
| 1 | a | 0.25 + 0.5 + 0.8 + 0.4 = 1.95 |
| 2 | c | 0.35 + 0.4 + 0.8 + 0.3 = 1.85 |
| 3 | b | 0.24 + 0.4 + 0.5 = 1.14 |
| 4 | d | 0.35 + 0.24 + 0.25 = 0.84 |
| 5 | e | 0.3 + 0.4 = 0.7 |

The resulting ranking position or relevance score values of the features represented by the nodes may be considered to indicate the relevance or usefulness of the feature across the feature subset, where the higher the ranking position or relevance score the stronger the relevance of the feature. The single subset of features (i.e., super-set) may be determined by selecting a predefined threshold number of features having the highest ranking position and/or relevance score (e.g., the top N features in the ranking list). Alternatively, the super-set of features may be determined by selecting all features with a relevance score above a predefined threshold, for example, features with a relevance score of T or higher.

In various embodiments, the edges of the generated merged feature graph described in FIG. 3 may be sorted, for example, into a ranked list, based on their edge weights. Table 3 below shows a ranked list of the edges of the merged feature graph of FIG. 5.

TABLE 3

| Ranking Position | Edge | Edge Weight |
|---|---|---|
| 1 | c-a | 0.8 |
| 2 | a-b | 0.5 |
| 3= | c-b | 0.4 |
| 3= | a-e | 0.4 |
| 5 | c-d | 0.35 |
| 6 | c-e | 0.3 |
| 7 | d-e | 0.25 |
| 8 | b-d | 0.24 |

The resulting ranking position or relevance score values of the edges may be considered to indicate the relevance or usefulness of the feature pairs connected by the edges, where the higher the ranking position or edge weight of the edge the stronger the relevance of the feature pair connected by the edge. The single subset of features (i.e., super-set) may be determined by selecting a predefined threshold number of feature pairs connected to edges having the highest ranking position and/or edge weight (e.g., the feature pairs connected by the top N edges in the ranking list). Alternatively, the super-set of features may be determined by selecting feature pairs of all edges with an edge strength above a predefined threshold, for example, feature pairs connected by edges with an edge strength of T or more.

In various embodiments, the single subset of features (super-set) may be selected by combining the ranking of the features and the ranking of the edges, as described above. Other methods for determining the super-set using the merged feature graph are possible and the selection method may be chosen according to the requirements of the desired application.

Those skilled in the art will appreciate, many variations of the above-described methods are possible for implementing the present invention. In various embodiments, the graph may be created for an individual subset having a ranked list of features based on a graph template in which only immediately adjacent nodes, or near nodes, in the ranked list of features are connected by an edge. For example, a feature at position p in the ranked list may be connected by an edge to its immediate neighbors in the list, i.e., the features at positions p+1 and p−1. Alternatively, a feature at position p in the ranked list may be connected by an edge to two or more near nodes in the list, such as features within n positions, i.e., features at positions up to and including p+n and p−n.

In various embodiments, irrespective of the subset of features type, the edge weight for an edge in each graph may be assigned an arbitrary predetermined value such as 1, as described in FIG. 3 in reference to step 345. In addition embodiments, the edge weight for an edge in each graph may be assigned a value based on any suitable parameter associated with the feature pair connected by the edge within the feature subset.

Figure 6:
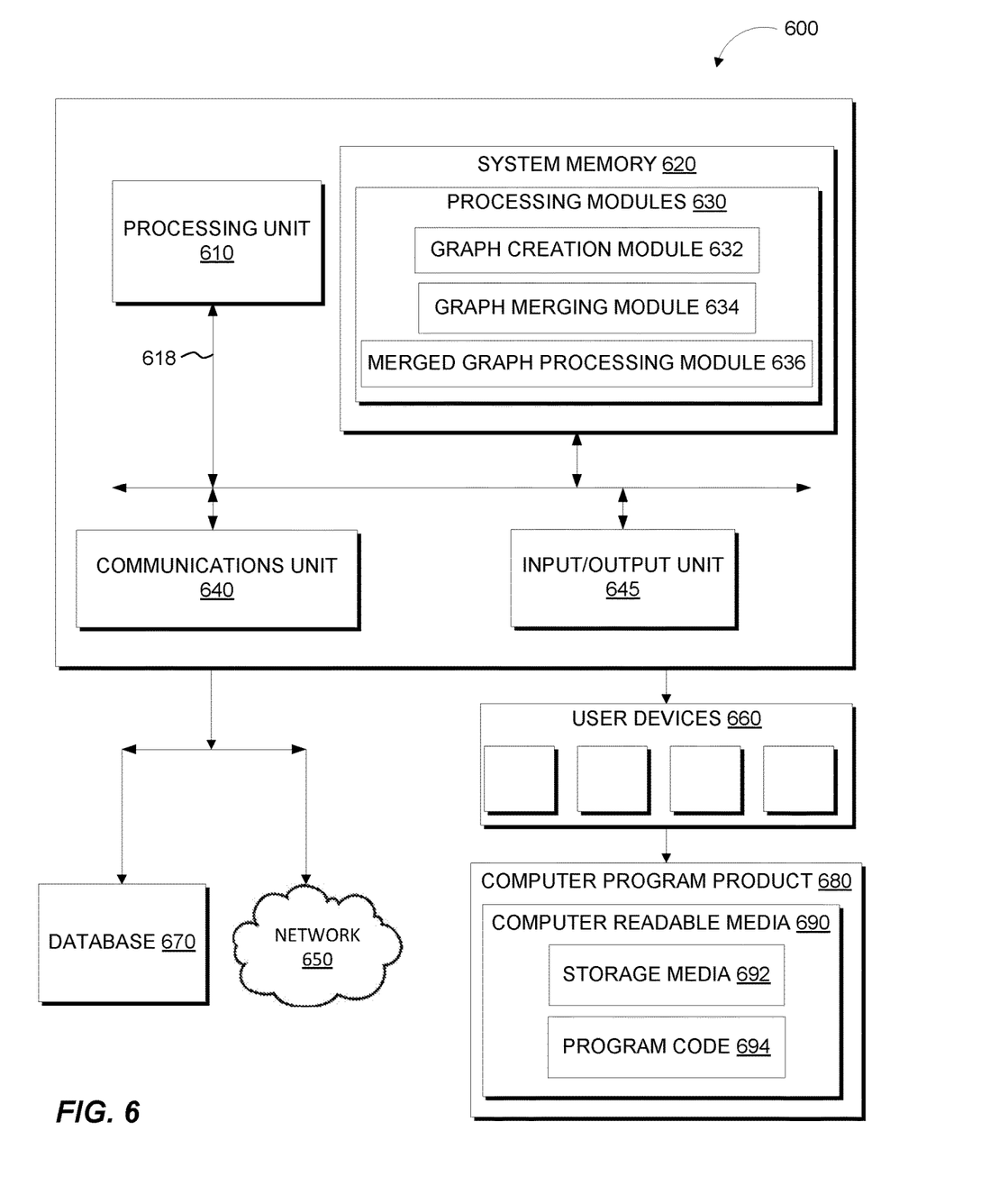
FIG. 6 depicts a block diagram of system according to an example implementation of the present disclosure.

FIG. 6 is a block diagram of system according to example implementations of the present disclosure. The system 600 includes a processing unit 610 in communication with system memory 620, all interconnected over a communications fabric 615. The processing unit 610 may be configured to perform steps of the above-described methods. For example, the system memory 620 may store processing modules 630 including processor-executable code for performing steps of above-described methods. The system 600 further includes a communication unit 640 for communicating data over a network 650, and input/output unit 645 for communicating data to and/or from user devices 660 such as a display, keyboard, mouse, printer and the like. Additionally, the communication unit 640 may allow the system 600 to be in communication, either directly or via network 650, with one or more databases 670 to access data from a dataset such as training data, live and/or real world data etc.

The processing modules 630 include a graph creation module 632 and a graph merging module 634. The graph creation module 732 includes computer-executable code for creating a graph to represent an individual subset of features based on a predefined graph template, for example as in steps 310, 320, 325, 330 & 335/345 of the method of FIG. 3. The graph merging module 634 includes computer-executable code for merging the graphs a plurality of individual subsets into a single merged feature graph, for example as in steps 340, 350, 355/360 & 360 of the method of FIG. 3. The system may optionally include a merged graph processing module 636. The merged graph processing module 636 includes computer-executable code for processing the merged feature graph to provide data for determining a single subset of features (i.e., super-set), for example as in step 390 of the method of FIG. 3.

In example implementations of the present disclosure, a computer program product 680 may be provided, as shown in FIG. 6. The computer program product 680 includes a computer readable media 690 having storage media 692 and program instructions 694 (i.e., program code) embodied therewith. The program instructions 694 may be loaded onto the system memory 620, for example as the above-described processing modules 630. The program instructions 694 are executable by the processor unit 610 to perform steps of above-described methods.

Figure 7:
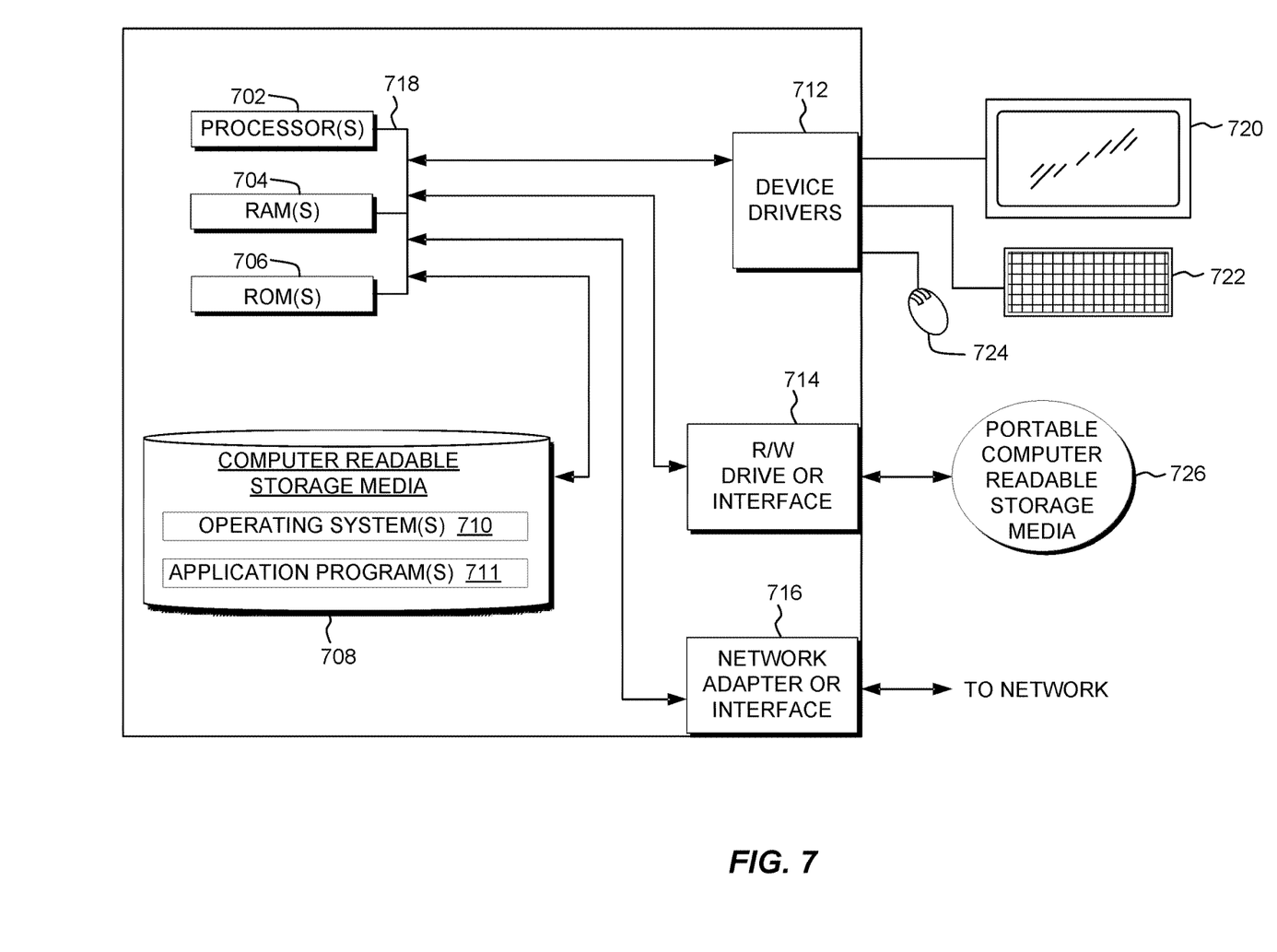
FIG. 7 depicts a block diagram of components of the server computer executing an application, in accordance with an embodiment of the present invention.

In an additional example of an implementation of the present disclosure, a computer program product 680 may be provided, as shown in FIG. 7. FIG. 7 depicts a block diagram of components of system 600 of FIG. 6, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

System 600 may include one or more processors 702, one or more computer-readable RAMs 704, one or more computer-readable ROMs 706, one or more computer readable storage media 708, device drivers 712, read/write drive or interface 714, network adapter or interface 716, all interconnected over a communications fabric 718. Communications fabric 718 may be implemented with any architecture designed for passing data and/or control information between processors (such as microprocessors, communications and network processors, etc.), system memory, peripheral devices, and any other hardware components within a system.

One or more operating systems 710, and one or more application programs 711, for example, processing modules 630, are stored on one or more of the computer readable storage media 708 for execution by one or more of the processors 702 via one or more of the respective RAMs 704 (which typically include cache memory). In the illustrated embodiment, each of the computer readable storage media 708 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

System 600 may also include a R/W drive or interface 714 to read from and write to one or more portable computer readable storage media 726. Application programs 711 on System 600 may be stored on one or more of the portable computer readable storage media 726, read via the respective R/W drive or interface 714 and loaded into the respective computer readable storage media 708.

System 600 may also include a network adapter or interface 716, such as a TCP/IP adapter card or wireless communication adapter (such as a 4G wireless communication adapter using OFDMA technology) for connection to a network 717. Application programs 711 on System 600 may be downloaded to the computing device from an external computer or external storage device via a network (for example, the Internet, a local area network or other wide area network or wireless network) and network adapter or interface 716. From the network adapter or interface 716, the programs may be loaded onto computer readable storage media 708. The network may comprise copper wires, optical fibers, wireless transmission, routers, firewalls, switches, gateway computers and/or edge servers.

System 600 may also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714 and network adapter or interface 716 may comprise hardware and software (stored on computer readable storage media 708 and/or ROM 706).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method comprising:
receiving a plurality of individual subsets of features of a dataset of features, each subset represented as a graph based on a predefined template, wherein each received subset of features includes relevance data representing relevance or relative relevance of features within the subset;
for each received subset of features, processing the relevance data associated with the features of the subset to determine an edge weight for each of the edges of the graph, wherein the edge weight represents a relationship between the feature pair represented by the pair of nodes connected by the corresponding edge, wherein the relevance data comprises, or may be used to derive, a distance between a pair of features in the subset of features, wherein an edge weight for an edge between a pair of nodes representing a feature pair is determined based on a formula in which the edge weight is inversely proportional to the distance between the feature pair;
merging the plurality of graphs by combining nodes representing a same feature of the graphs and combining edge weights representing a same relationship between features to form a merged feature graph;
determining a relevance score for each of the features;
determining a super-set graph comprising nodes in the merged feature graph having a relevance score above a threshold relevance score;
displaying the super-set graph to a user to enable the user to select aspects of the super-set graph to be included as a training graph, wherein displaying the super-set graph comprises displaying how nodes and edges were determined; and
training a machine learning model based on the training graph.

2. The method of claim 1, wherein the received relevance data comprises, a rank value of each feature of the subset of features based on the relevance value, wherein weighted edge value is calculated using the following formula:

$$\text{Edge Weight} = [1/(1+\text{Pos. Diff})] * [W * e^{(-\text{Decay}/5)}]$$

Wherein Pos. Diff is the difference in position between the feature pair in the feature ranking;
W is a weight for decay, and
Decay is top position of any two connected features in the feature ranking, starting from 0.

3. The method of claim 1, further comprising:
using the merged feature graph to identify the single subset of features by selecting a subset of features from the merged feature graph based on one or more of:
all of the features represented by nodes in the merged feature graph;
a threshold number of the most relevant features represented by nodes in the merged feature graph;
all features represented by nodes in the merged feature graph meeting a threshold relevance value;
all features of feature pairs represented by edges in the merged feature graph meeting a threshold merged edge weight, and
features represented by nodes or connected by edges in the merged feature graph meeting any other suitable threshold.

4. The method of claim 1, further comprising:
presenting a visualized representation of the merged feature graph, to enable user selection of the single subset of features.

5. The method of claim 1, wherein the received plurality of subsets of features of the dataset are generated using two or more feature selection methods.

6. The method of claim 1, further comprising:
selecting a single subset of features using the merged feature graph;
creating a model using training data based on the single subset of features, and
applying the model to live and/or real world data in a system.

* * * * *